United States Patent
Oki et al.

(10) Patent No.: US 12,017,504 B2
(45) Date of Patent: Jun. 25, 2024

(54) DUCT STRUCTURE

(71) Applicants: KYORAKU CO., LTD., Kyoto (JP); TOYOTA JIDOSHA KABUSHIKI KAISHA, Toyota (JP)

(72) Inventors: Ryosuke Oki, Nagoya (JP); Tomoya Taguchi, Toyota (JP)

(73) Assignees: KYORAKU CO., LTD., Kyoto (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 70 days.

(21) Appl. No.: 17/782,186

(22) PCT Filed: Jan. 8, 2021

(86) PCT No.: PCT/JP2021/000502
§ 371 (c)(1),
(2) Date: Jun. 3, 2022

(87) PCT Pub. No.: WO2021/145282
PCT Pub. Date: Jul. 22, 2021

(65) Prior Publication Data
US 2023/0001765 A1   Jan. 5, 2023

(30) Foreign Application Priority Data
Jan. 15, 2020  (JP) .................. 2020-004122

(51) Int. Cl.
*B60H 1/00* (2006.01)
*F16L 5/10* (2006.01)

(52) U.S. Cl.
CPC ............ *B60H 1/00564* (2013.01); *F16L 5/10* (2013.01); *B60H 2001/00635* (2013.01)

(58) Field of Classification Search
CPC ........................................................ F16L 5/10
See application file for complete search history.

(56) References Cited

U.S. PATENT DOCUMENTS

| | | | |
|---|---|---|---|
| 4,147,382 A | 4/1979 | Wachter | |
| 2009/0025559 A1* | 1/2009 | Mello | F24F 8/192 96/57 |

(Continued)

FOREIGN PATENT DOCUMENTS

| | | |
|---|---|---|
| DE | 7704657 U1 | 6/1977 |
| JP | H07167304 A | 7/1995 |

(Continued)

OTHER PUBLICATIONS

Extended European Search Report issued on May 10, 2023, in corresponding European Application No. 21740990.3, 8 pages.

(Continued)

*Primary Examiner* — Zachary T Dragicevich
*Assistant Examiner* — James A Linford
(74) *Attorney, Agent, or Firm* — Maier & Maier, PLLC

(57) ABSTRACT

A duct structure having excellent sealing performance at a connection portion between a duct and a piping member. The duct structure includes a duct and a piping member. The duct includes an opening in a tubular portion, and the piping member includes a piping portion. The piping portion is inserted into the opening and connected to the duct, and a foam rubber sealing material is disposed in a compressed state between an outer peripheral surface of the piping portion and an edge of the opening.

5 Claims, 8 Drawing Sheets

(56) References Cited

U.S. PATENT DOCUMENTS

| | | | |
|---|---|---|---|
| 2010/0133366 A1 | 6/2010 | Yano et al. | |
| 2017/0334265 A1* | 11/2017 | Werner | F04D 29/023 |
| 2019/0084371 A1* | 3/2019 | Tominaga | B60H 1/00535 |
| 2020/0326097 A1* | 10/2020 | Jezik | F24F 13/12 |
| 2020/0398635 A1* | 12/2020 | Rademacher | B23P 6/00 |

FOREIGN PATENT DOCUMENTS

| | | | |
|---|---|---|---|
| JP | 2000108635 A | 4/2000 |
| JP | 2000220881 A | 8/2000 |
| JP | 2003112520 A | 4/2003 |
| JP | 2003227646 A | 8/2003 |
| JP | 200638322 A | 2/2006 |
| JP | 2006341759 A | 12/2006 |
| JP | 2007163109 A | 6/2007 |
| JP | 200979838 A | 4/2009 |
| JP | 2009126228 A | 6/2009 |

OTHER PUBLICATIONS

International Search Report (with English Translation) and Written Opinion (with Machine Translation) issued on Mar. 16, 2021 in corresponding International Application No. PCT/JP2021/000502; 15 pages.

Office Action issued on Jan. 23, 2024, in corresponding Japanese Application No. 2020-004122, 10 pages.

Office Action issued on Sep. 26, 2023, in corresponding Japanese Application No. 2020004122, 8 pages.

Office Action issued on Mar. 19, 2024, in corresponding Japanese Application No. 2020-004122, 15 pages.

\* cited by examiner

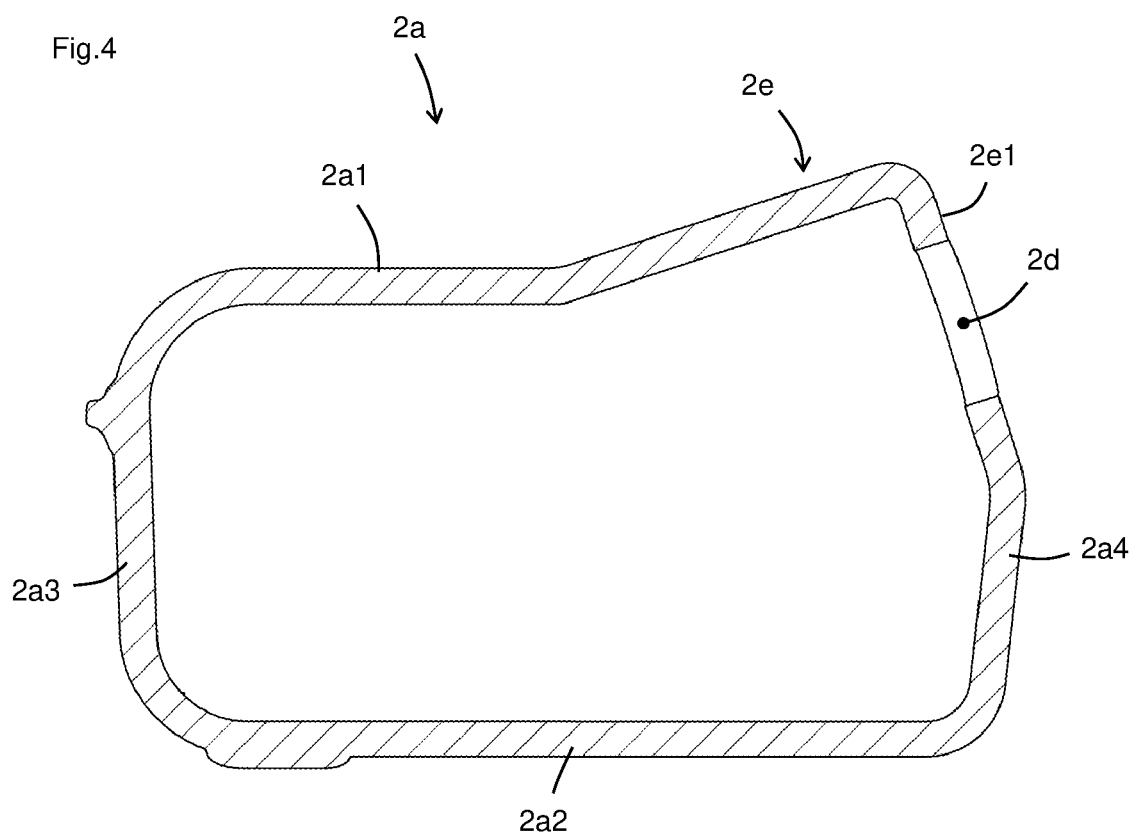

DUCT STRUCTURE

FIELD

The present invention relates to a duct structure.

BACKGROUND

Patent Literature 1 discloses a technology for blowing out a sterilizing ion generated from a sterilizing ion generator from an air outlet of an air conditioner.

CITATION LIST

Patent Literature 1: Japanese Unexamined Patent Application Publication No. 2006-341759

SUMMARY

As a specific configuration for blowing out the sterilizing ion from the air outlet of the air conditioner, a configuration where a piping member extending from the sterilizing ion generator is inserted into an opening provided in a tubular portion of a duct of the air conditioner to be connected. The piping member and the duct are usually connected via a sealing material called a grommet.

By the way, since it is difficult to control a wall thickness in blow molding, when the duct is formed by the blow molding, the wall thickness of the duct tends to vary. The grommet is attached to the opening of the duct by engaging a groove on an outer peripheral surface of the grommet with an edge of the opening of the duct. Therefore, when the wall thickness of the duct fluctuates, the grommet becomes wobbly or the edge of the opening of the duct has difficulty engaging the groove of the grommet, as a result a sealing performance at a connection portion between the duct and the piping member may deteriorate.

The present invention has been made by taking the afore-mentioned circumstances into consideration. The present invention provides a duct structure with superior sealing at a connection portion between a duct and a piping member.

According to the present invention, a duct structure comprising a duct and a piping member is provided. The duct includes an opening in a tubular portion. The piping member includes a piping portion. The piping portion is inserted into the opening and connected to the duct. And a foamed rubber sealing material is disposed in a compressed state between an outer peripheral surface of the piping portion and an edge of the opening.

In the duct structure of the present invention, the foamed rubber sealing material is disposed in a compressed state between the outer peripheral surface of the piping portion and the edge of the opening of the duct. The compressed foamed rubber sealing material is pressed against the edge of the opening of the duct and the piping portion by its own restoring force, so even if a wall thickness of the duct changes, a sealing performance at a connection portion between the duct and the piping member does not deteriorate, the sealing performance at the connection portion between the duct and the piping member is excellent.

Hereinafter, various embodiments of the present invention will be described. The embodiments described hereinafter can be combined with each other.

Preferably, the sealing material has a sheet shape and is wound around the outer peripheral surface.

Preferably, the piping portion includes a protrusion protruding from the outer peripheral surface, and the sealing material is wound around the outer peripheral surface to cover at least a part of the protrusion.

Preferably, the foamed rubber has a compression hardness of 10 to 40 N at 50% compression.

Preferably, a protruding portion that projects toward an outside of the tubular portion is provided in the tubular portion, and the opening is provided with the protruding portion.

Preferably, the duct is a blow molding product.

BRIEF DESCRIPTION OF THE DRAWINGS

FIG. 4 is a cut surface end view of a surface which passes through a center of an opening 2d, in a tubular portion 2a including a protruding portion 2e.

DETAILED DESCRIPTION

Various embodiments of the present invention are described below. Any of the embodiments described below can be combined with each other. Respective features independently form the invention.

Figure 1:
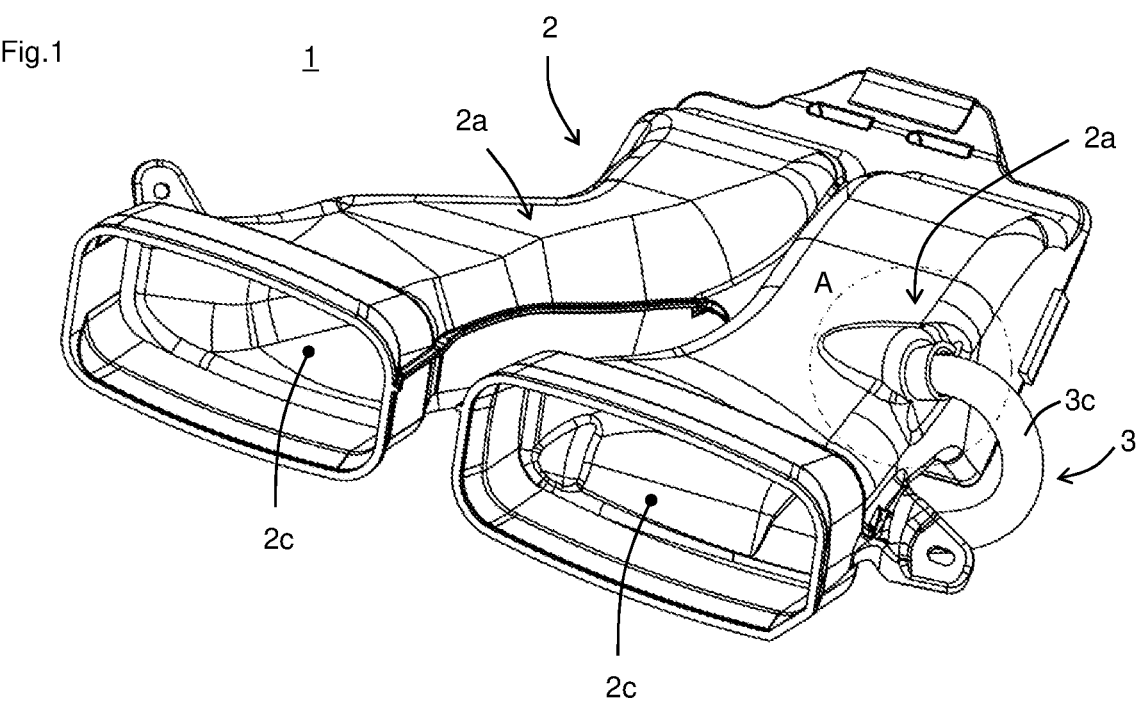
FIG. 1 is a perspective view which viewed a duct structure 1 of according to one embodiment of the present invention from diagonally above.

As shown in FIG. 1, a duct structure 1 according to one embodiment of the present invention is a vehicle duct structure arranged on an instrument panel or a ceiling of a vehicle, and the duct structure 1 includes a duct 2 and a piping member 3. The piping member 3 is a member for connecting a sterilizing ion generator (not shown) and the duct 2. The sterilizing ion generated from the sterilizing ion generator is introduced into the duct 2 through the piping member 3. One example of the sterilizing ion is nanoe ion. In the present embodiment, the piping member 3 is supposed to connect the sterilizing ion generator and the duct 2, but the piping member 3 may connect a device that generates another component (for example, an aroma component) to the duct 2.

Figure 5:
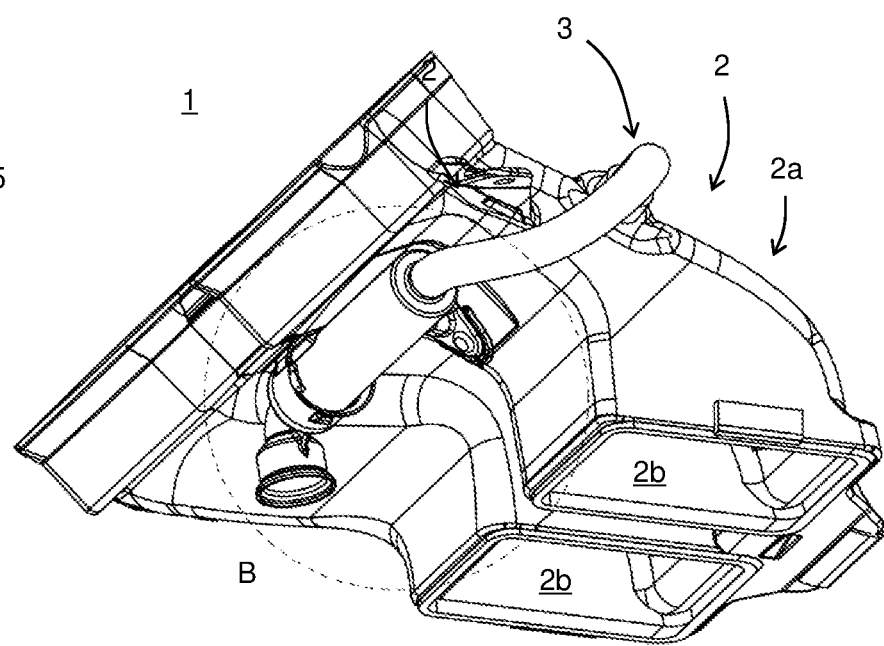
FIG. 5 is a perspective view which viewed the duct structure 1 of FIG. 1 from diagonally below.

As shown in FIGS. 1 and 5, the duct 2 includes a pair of tubular portions 2a, a pair of suction ports 2b, and a pair of air outlets 2c. An air sent from an air conditioner (not shown) enters the duct 2 from the suction ports 2b, passes through a ventilation path in the tubular portions 2a, and is blown out from the air outlets 2c. A number of the tubular portion 2a, the suction port 2b, and the air outlet 2c can be changed as appropriate. For example, it is possible to configure an air entering from one suction port 2b to be blown out from four outlets 2c.

Figure 2A:
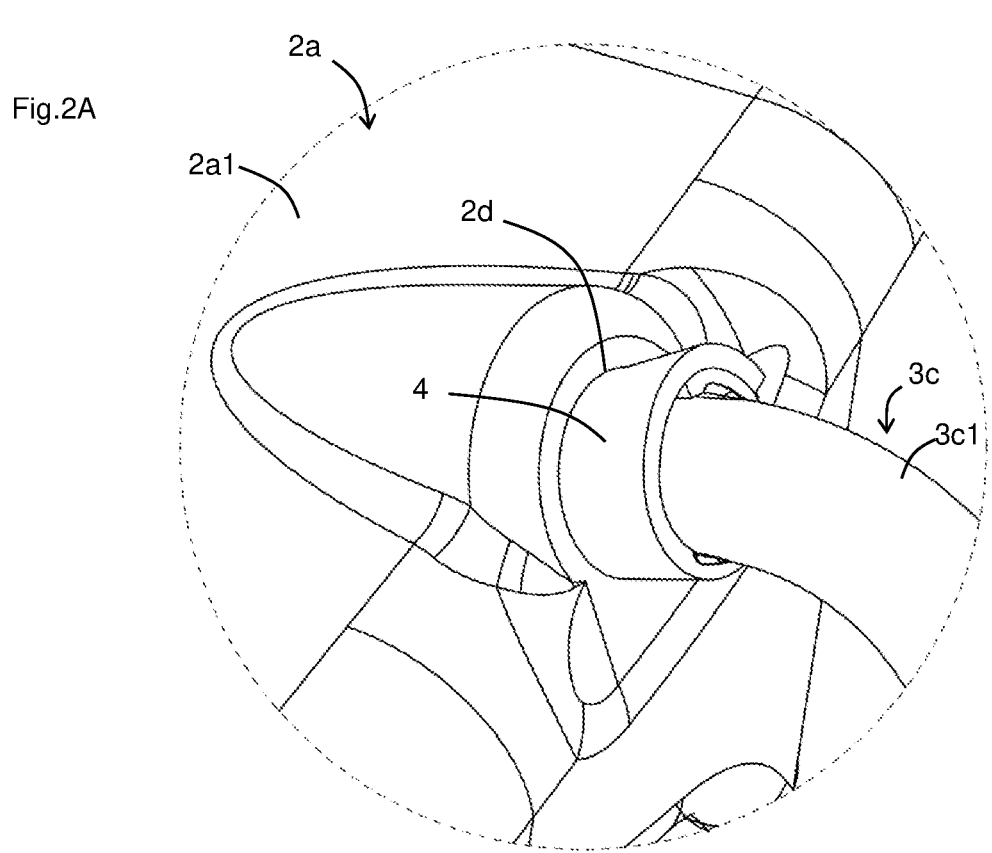
FIG. 2A is an enlarged view of a region A in FIG. 1.
Figure 2B:
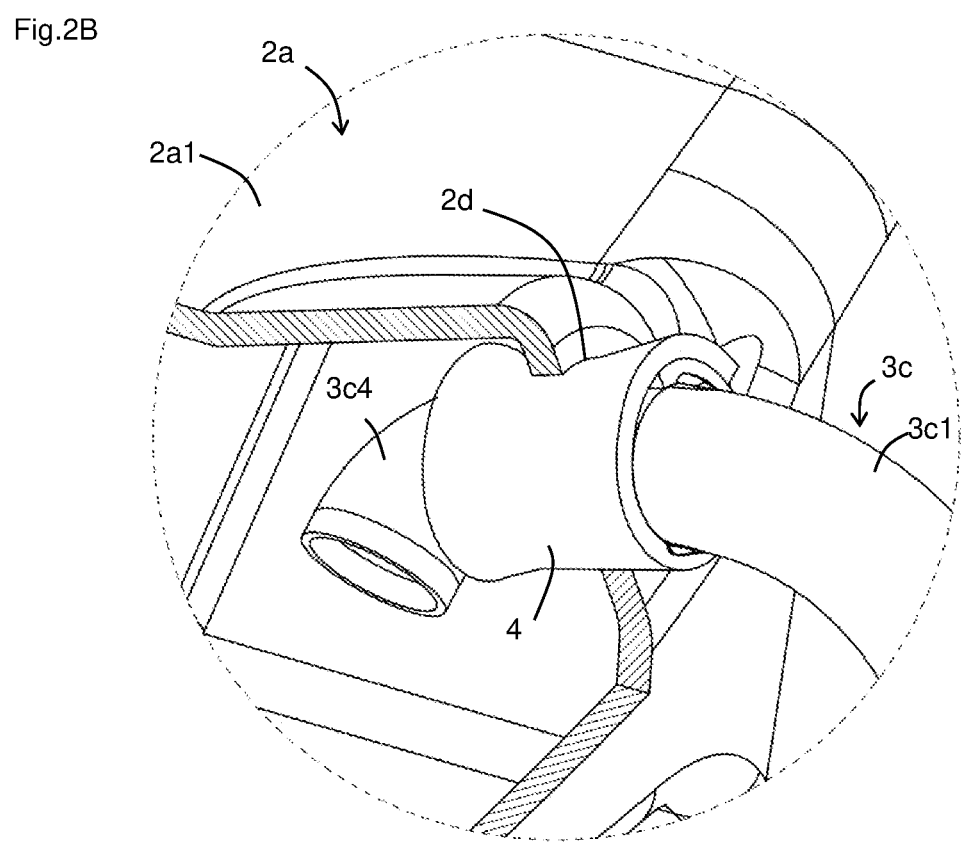
FIG. 2B is a view in which a tubular portion 2a is partially cut out from FIG. 2A.
Figure 3A:
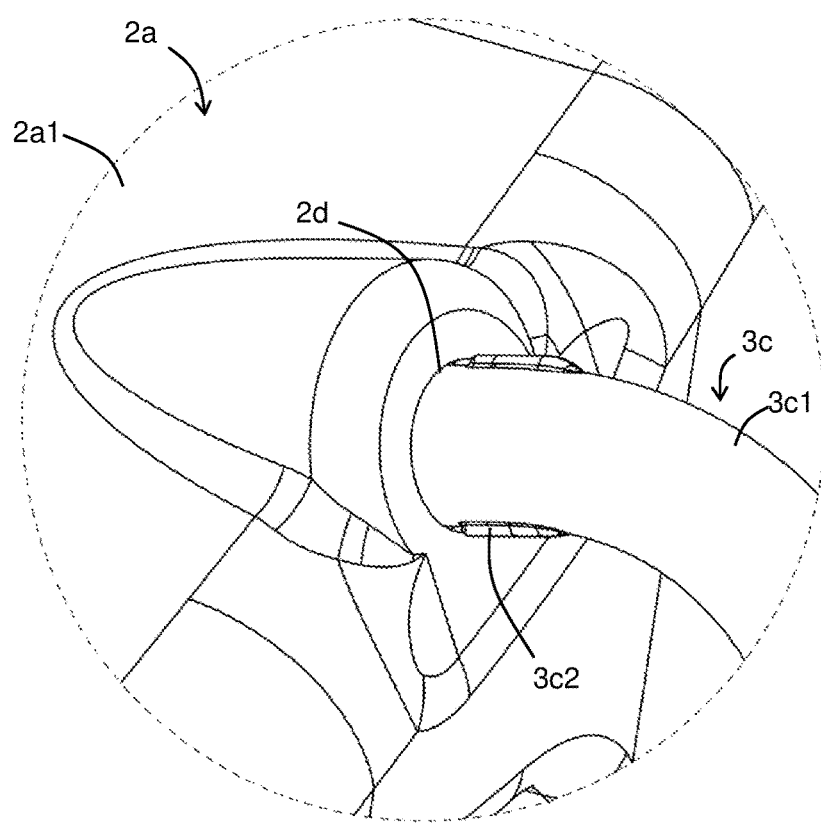
FIG. 3A is a diagram showing a state in which a sealing material 4 is removed from FIG. 2A.
Figure 3B:
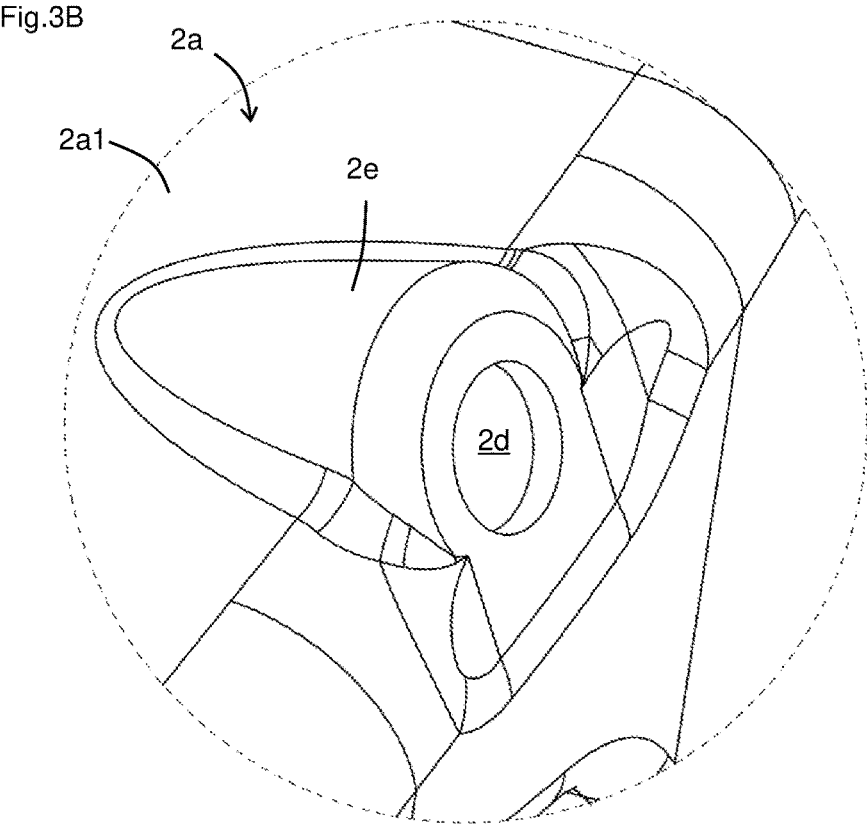
FIG. 3B is a diagram showing a state in which a piping portion 3c is removed from FIG. 3A.

As shown in FIG. 3B, an opening 2d is provided in the tubular portion 2a. As shown in FIGS. 2A to 3A, a piping portion 3c of the piping member 3 is inserted into the opening 2d and connected to the duct 2. A foamed rubber sealing material 4 is disposed in a compressed state between an outer peripheral surface 3c1 of the piping portion 3c and an edge of the opening 2d. The compressed foamed rubber sealing material 4 is pressed against the edge of the opening 2d and the outer peripheral surface 3c1 by its own restoring force, so even if a wall thickness of the duct 2 changes, a sealing performance at a connection portion between the duct 2 and the piping member 3 does not deteriorate, the sealing performance at the connection portion between the duct 2 and the piping member 3 is excellent.

The duct 2 is preferably a foam duct. Since a wall thickness of the foam duct tends to vary widely, a technical significance of applying the present invention is particularly remarkable. A foaming ratio of the foam duct is, for example, 1.5 to 5 times, preferably 2 to 4 times, and specifically for example, 1.5, 2.0, 2.5, 3.0, 3.5, 4.0, 4.5 or 5.0 times, and can be in the range between the two values exemplified herein. An average wall thickness of the tubular portion 2a of the duct 2 is, for example, 1 to 5 mm, preferably 2 to 4 mm, and specifically for example, 1, 1.5, 2, 2.5, 3, 3.5, 4, 4.5 or 5 mm, and can be in the range between the two values exemplified herein.

The sealing material 4 has a sheet shape and is preferably wound around the outer peripheral surface 3c1. A planar shape of the sheet is preferably rectangular. A value of [a width of the sealing material 4 (a length in a wall thickness direction of the tubular portion 2a)/the wall thickness of the tubular portion 2a] is preferably 3 to 20, more preferably 5 to 15. If this value is too small, the sealing performance may deteriorate, and if this value is too large, it may lead to an increase in cost, or a part arranged in the tubular portion 2a may become long, leading to abnormal noise during ventilation. Specifically, this value is, for example, 3, 4, 5, 6, 7, 8, 9, 10, 11, 12, 13, 14, 15, 16, 17, 18, 19 or 20, and can be in the range between the two values exemplified herein.

An outer peripheral diameter of the piping portion 3c is smaller than an inner peripheral diameter of the opening 2d, but the outer peripheral diameter of the sealing material 4 in a state in which the sealing material 4 is wound around the outer peripheral surface 3c1 is larger than the inner peripheral diameter of the opening 2d. Therefore, in a state in which the sealing material 4 is wound around the outer peripheral surface 3c1, the sealing material 4 is pressed and compressed, and in that state, the piping portion 3c and the sealing material 4 are inserted into the opening 2d, and then an external force applied to the sealing material 4 is removed. Then, the sealing material 4 tries to return to an original shape and is pressed against an edge of the opening 2d and the outer peripheral surface 3c1, and the connecting portion between the duct 2 and the piping member 3 is sealed. In the present specification, the outer peripheral diameter means a diameter of a circumscribed circle, and the inner peripheral diameter means a diameter of an inscribed circle.

If the sealing material 4 is an annular member, it is troublesome to attach the sealing material 4 to the outer peripheral surface 3c1, but in the present embodiment, since the sealing material 4 has a sheet shape and it is able to attach to the outer peripheral surface 3c1 simply by winding the sealing material 4 around the outer peripheral surface 3c1, it is excellent in assembleability. In addition, since the sheet shaped sealing material 4 is usually cheaper than a grommet, it is able to reduce a manufacturing cost by adopting the sheet shaped sealing material 4.

Figure 8:
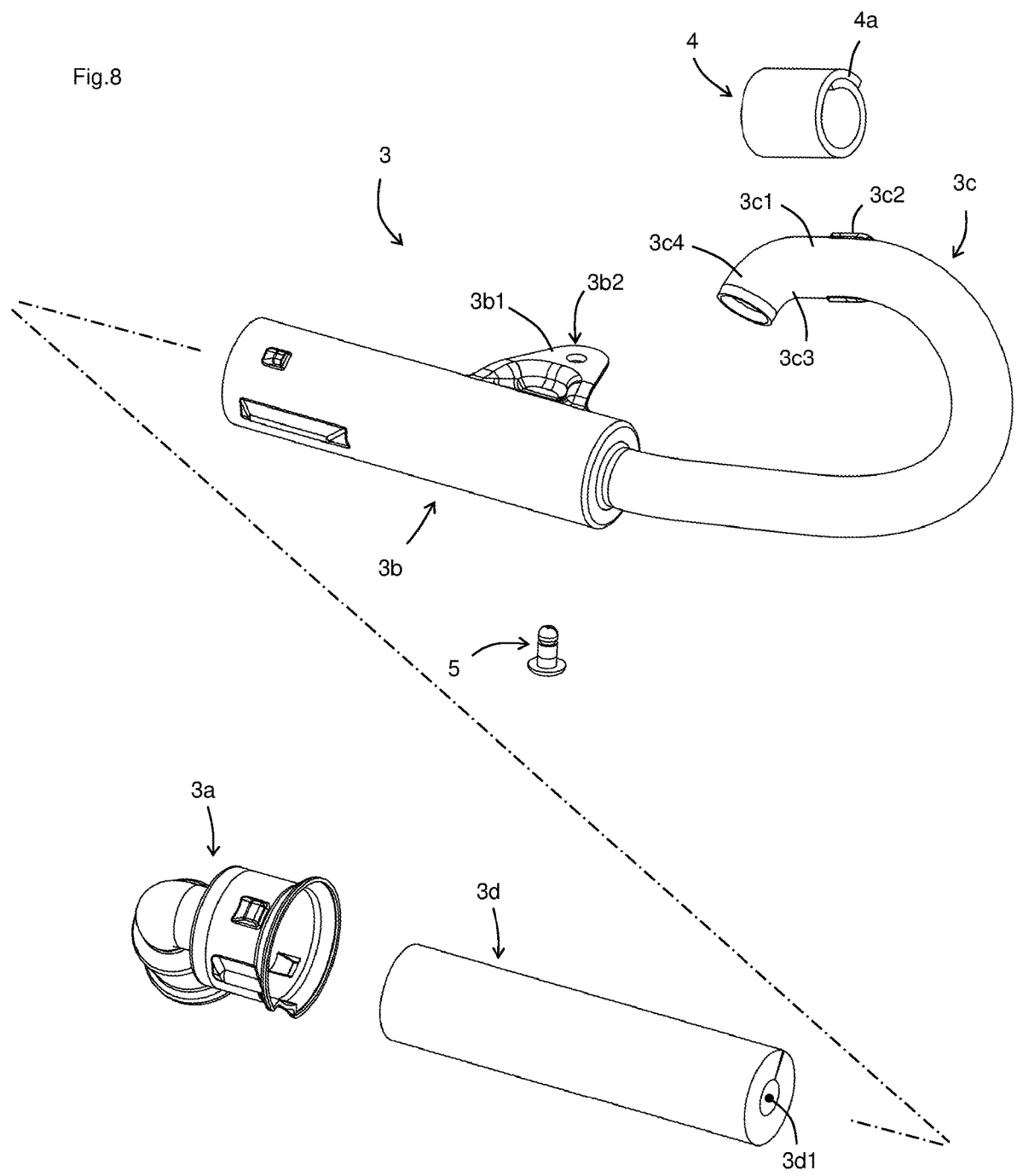
FIG. 8 is an exploded perspective view of FIG. 7A.

Further, as shown in FIG. 8, in the present embodiment, a bent portion 3c3 is provided near a tip of the piping portion 3c. In this case, if the sealing material 4 is an annular member, it is particularly troublesome to attach the sealing material 4 to the outer peripheral surface 3c1, so that a technical significance of adopting the sheet shaped sealing material 4 is particularly remarkable. As shown in FIG. 2B, the piping member 3 is connected to the duct 2 so that a part 3c4 on a tip side faces the air outlet 2c side rather than the bent portion 3c3. Therefore, the sterilizing ion smoothly joins the air from the air conditioner.

Figure 7A:
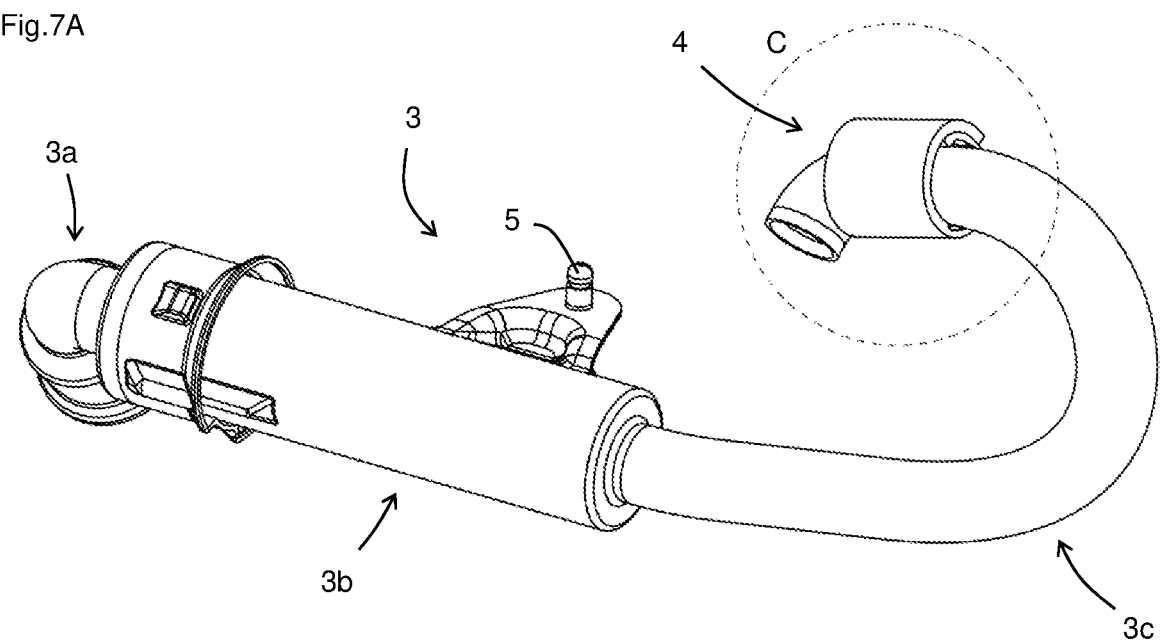
FIG. 7A is a perspective view of the piping member 3 and the sealing material 4 extracted from FIG. 1.
Figure 7B:
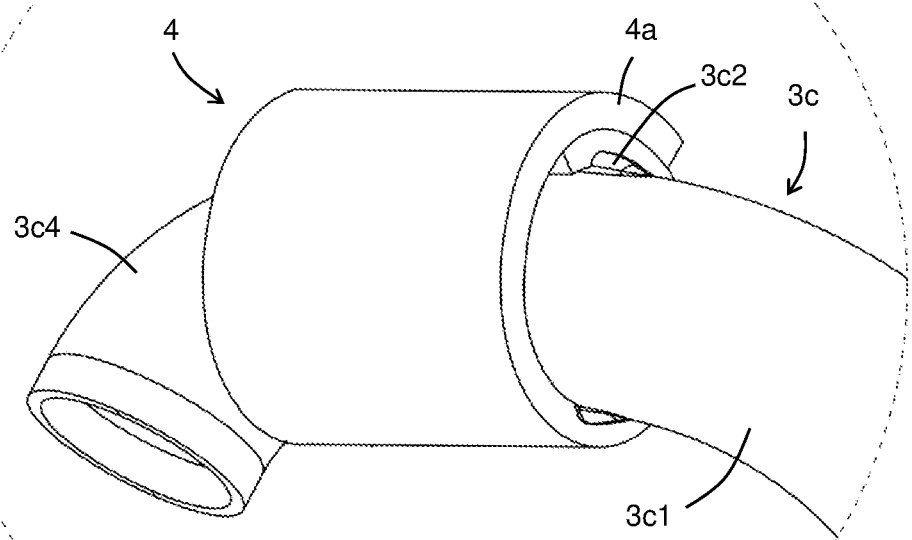
FIG. 7B is an enlarged view of a region C in FIG. 7A.

Further, as shown in FIG. 7, it is preferable that the sealing material 4 is wound around the outer peripheral surface 3c1 so that an overlapping portion 4a is formed. This is because if the overlapping portion 4a is not formed, an air may leak from a gap between both ends of the sealing material 4.

As shown in FIGS. 3A and 7 to 8, a protrusion 3c2 protruding from the outer peripheral surface 3c1 is provided in the piping portion 3c. As shown in FIGS. 7 to 8, the sealing material 4 is wound around the outer peripheral surface 3c1 to cover at least a part of the protrusion 3c2. In the present embodiment, the sealing material 4 covers a part of the protrusion 3c2, but the sealing material 4 may cover the whole of the protrusion 3c2. As shown in FIG. 3A, the protrusion 3c2 is disposed to be located outside the tubular portion 2a with the piping portion 3c inserted into the opening 2d. At a part in which the sealing material 4 covers the protrusion 3c2, the outer peripheral diameter of the sealing material 4 is increased by the amount of the protrusion 3c2, and it is impossible or very difficult to insert the part into the opening 2d. Therefore, by providing the protrusion 3c2, it is possible to prevent the piping portion 3c from being inserted excessively deep into the tubular portion 2a. The protrusions 3c2 may be provided at least at one location, and preferably at two or more locations.

A value of [(an inner circumference diameter of the opening 2d— an outer circumference diameter of the piping portion 3c)/a thickness of the sealing material 4] is preferably 0.2 to 0.8, more preferably 0.3 to 0.7, and more specifically for example, 0.2, 0.3, 0.4, 0.5, 0.6, 0.7 or 0.8, and can be in the range between the two values exemplified herein. If this value is too small, it may be difficult to insert the piping portion 3c and the sealing material 4 into the opening 2d, and if this value is too large, it may be insufficient to seal at the connecting portion between the duct 2 and the piping member 3.

A foamed rubber constituting the sealing material 4 preferably has a compression hardness of 10 to 40 N at 50% compression, and more preferably 20 to 30 N. If the compression hardness is too low, it may be insufficient to seal at the connecting portion between the duct 2 and the piping member 3, and if the compression hardness is too high, it may be difficult to insert the piping portion 3c and the sealing material 4 into the opening 2d. Specifically, the compression hardness at 50% compression is, for example, 10, 15, 20, 25, 30, 35 or 40 N, and can be in the range between the two values exemplified herein. The compression hardness at 50% compression can be measured according to JIS K 6767:1999.

The foam rubber can be a foam of rubber, preferably a foam of EPDM (ethylene propylene diene rubber). An example of such foamed rubber is Lucilla made by Toyo Quality One Co.

As shown in FIGS. 1 and 4, the tubular portion 2a includes an upper wall 2a1, a lower wall 2a2, an inner side wall 2a3, and an outer wall 2a4. The upper wall 2a1 and the lower wall 2a2 face each other, and the inner side wall 2a3 and the outer wall 2a4 face each other. The upper wall 2a1 and the lower wall 2a2 are connected to each other by the inner side wall 2a3 and the outer wall 2a4. The inner side wall 2a3 is a side wall facing the other tubular portion 2a, and the outer wall 2a4 is a side wall facing the outside of the duct 2.

A protruding portion 2e that projects toward the outside of the tubular portion 2a is provided in the tubular portion 2a. The protruding portion 2e is provided on the upper wall 2a1 and has a conical shape in which a protruding amount gradually increases toward the outer wall 2a4. A flat portion 2e1 is provided on a surface on the outer wall 2a4 side in the protruding portion 2e. The opening 2d is provided in the flat portion 2e1.

The duct 2 is, for example, a blow molding product formed by blow molding of a molten parison made of a resin such as polyolefin. In this case, the opening 2d is usually formed by post-processing after blow molding, but since a blow ratio of the protruding portion 2e is larger than that of the peripheral portion, a wall thickness is reduced by that amount. Therefore, by providing the opening 2d in the protruding portion 2e, a processing for forming the opening 2d becomes easy. Further, by providing the opening 2d in the flat portion 2e1, the processing for forming the opening 2d becomes easier.

As shown in FIGS. 7 to 8, the piping member 3 includes a connector portion 3a, an accommodating portion 3b, the piping portion 3c, and a sound absorbing member 3d. The accommodating portion 3b and the piping portion 3c are integrally formed. The connector portion 3a, the accommodating portion 3b and the piping portion 3c are, for example, a blow molding product formed by blow molding of a molten parison made of a resin such as polyolefin. The sound absorbing member 3d is accommodated in the accommodating portion 3b. The connector portion 3a can be fitted with the accommodating portion 3b. Therefore, the sound absorbing member 3d is stably held in the accommodating portion 3b by fitting the sound absorbing member 3d with the connector portion 3a and the accommodating portion 3b in a state in which the sound absorbing member 3d is accommodated in the accommodating portion 3b. The connector portion 3a is configured to be connectable to a connector of an outlet of the sterilizing ion of the sterilizing ion generator (not shown). It is preferable to dispose a foamed rubber sealing material between the connector of the sterilizing ion generator and the connector portion 3a. The sound absorbing member 3d is a member for reducing noise from the sterilizing ion generator, and the sound absorbing member 3d is an annular member having a ventilation passage 3d1 in a center. In one example, it is able to dispose the sheet shaped sound absorbing member 3d in the accommodating portion 3b in a state in which the sound absorbing member 3d is rolled into an annular shape. In one example, the sound absorbing member 3d is made of the same foamed rubber as the sealing material 4.

Figure 6A:
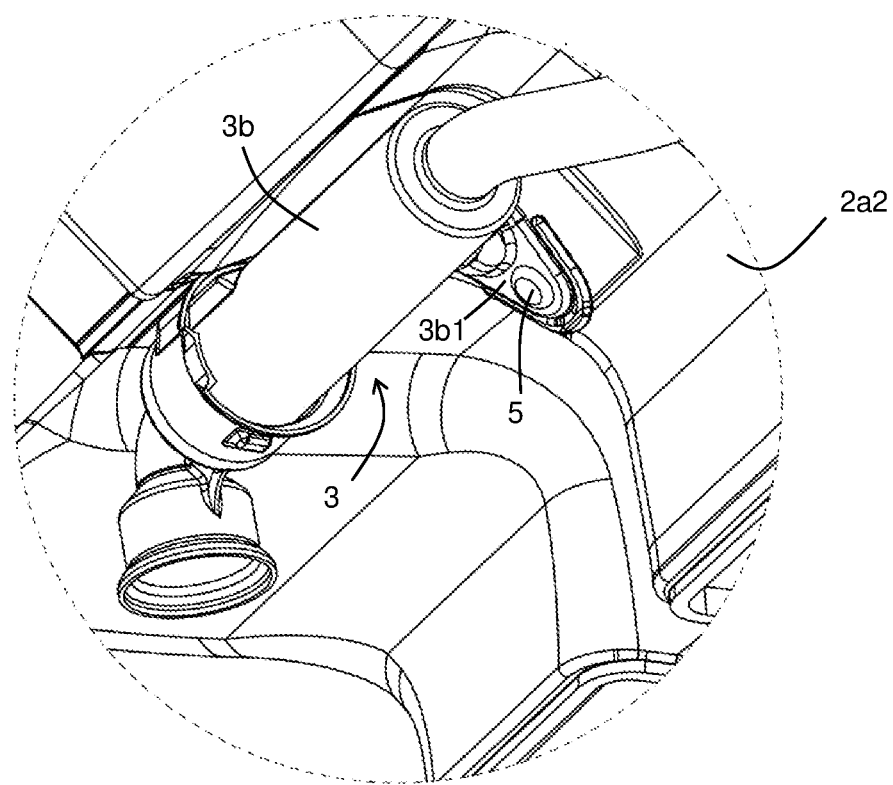
FIG. 6A is an enlarged view of a region B in FIG. 5.
Figure 6B:
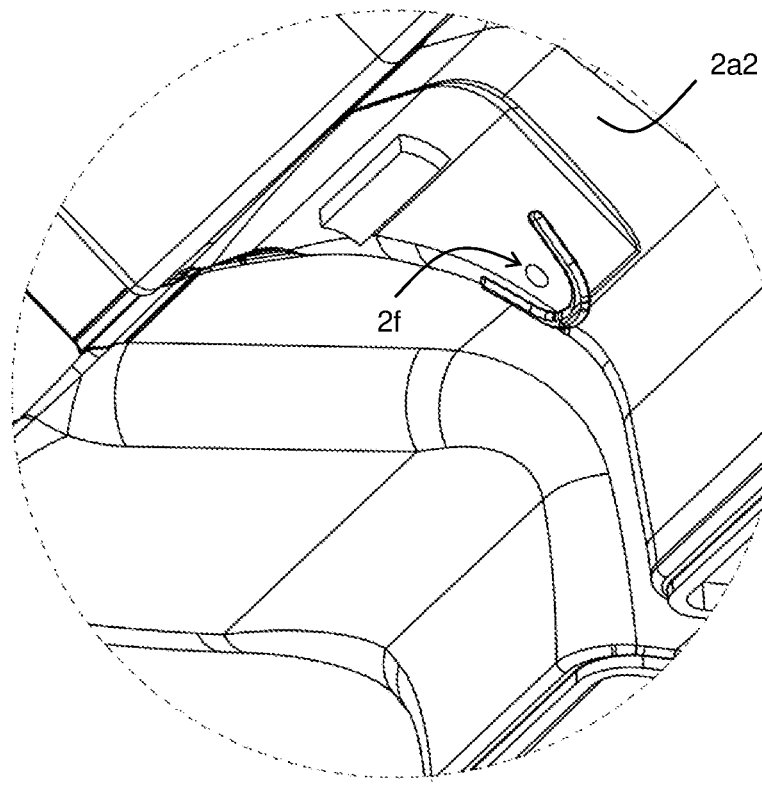
FIG. 6B is a view showing a state in which a piping member 3 is removed from FIG. 6A.

A mounting piece 3b1 is provided in the accommodating portion 3b, and an opening 3b2 is provided in the mounting piece 3b1. As shown in FIG. 6B, an opening 2f is provided in the lower wall 2a2 of the tubular portion 2a. As shown in FIG. 6A, it is able to fix the mounting piece 3b1 to the tubular portion 2a by penetrating a penetration fixture 5 through the opening 3b2 and the opening 2f. Examples of the penetration fixture 5 include rivets (preferably blind rivets) and combinations of bolds and nuts, etc.

REFERENCE SIGNS LIST

1: duct structure, 2: duct, 2a: tubular portion, 2a1: upper wall, 2a2: lower wall, 2a3: inner side wall, 2a4: outer wall, 2b: suction port, 2c: air outlet, 2d: opening, 2e: protruding portion, 2e1: flat portion, 2f: opening, 3: piping member, 3a: connector portion, 3b: accommodating portion, 3b1: mounting piece, 3b2: opening, 3c: piping portion, 3c1: outer peripheral surface, 3c2: protrusion, 3c3: bent portion, 3c4: part, 3d: sound absorbing member, 3d1: ventilation path, 4: seal material, 4a: overlapping portion, 5: penetration fixture

The invention claimed is:

1. A duct structure comprising:
a monolithic duct, wherein the monolithic duct includes a rectangularly shaped tubular portion having a protruding portion having a conical shape that projects outwardly with respect to an outer surface of the rectangularly shaped tubular portion and includes a flat portion at a frustum of the conical shape which has an opening there through; and
a piping member that includes a piping portion, wherein the piping portion is inserted into the opening and connected to the monolithic duct, and a foamed rubber sealing material is disposed in a compressed state between an outer peripheral surface of the piping portion and an edge of the opening.

2. The duct structure of claim 1, wherein the sealing material has a sheet shape and is wound around the outer peripheral surface.

3. The duct structure of claim 1, wherein the piping portion includes a protrusion protruding from the outer peripheral surface, and the sealing material is wound around the outer peripheral surface to cover at least a part of the protrusion.

4. The duct structure of claim 1, wherein the foamed rubber has a compression hardness of 10 to 40 N at 50% compression.

5. The duct structure of claim 1, wherein the monolithic duct is a blow molding product.

* * * * *